Feb. 17, 1942.  F. P. THOMAS  2,273,601
CONTAINER
Filed Jan. 22, 1940  6 Sheets-Sheet 1

Inventor:
Frank P. Thomas,

Feb. 17, 1942.     F. P. THOMAS     2,273,601
CONTAINER
Filed Jan. 22, 1940     6 Sheets-Sheet 2
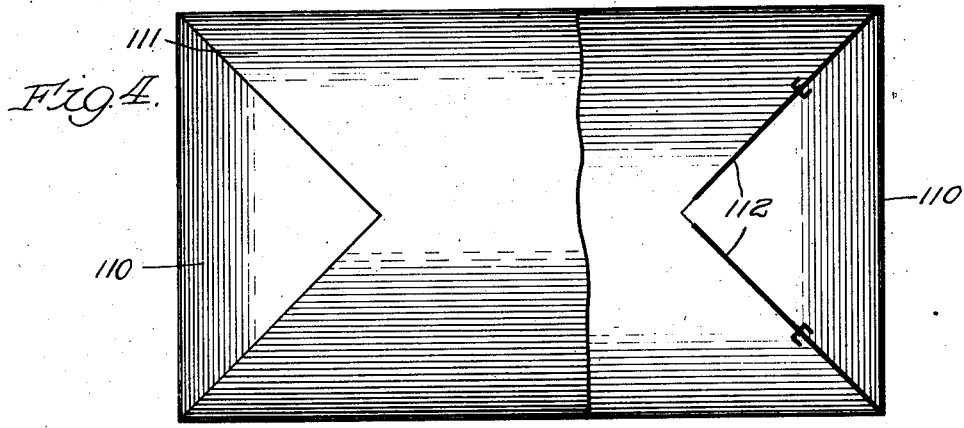
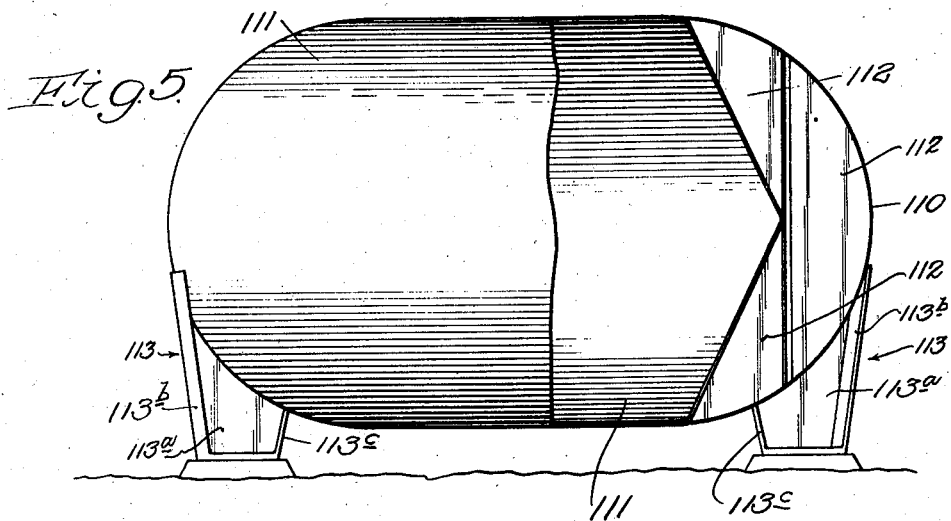
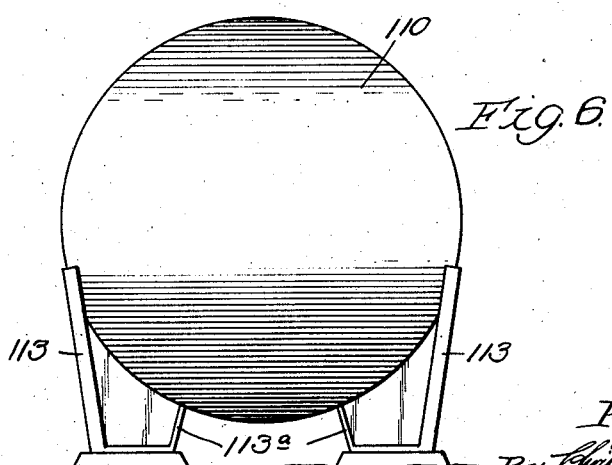

Feb. 17, 1942. F. P. THOMAS 2,273,601
CONTAINER
Filed Jan. 22, 1940 6 Sheets-Sheet 3
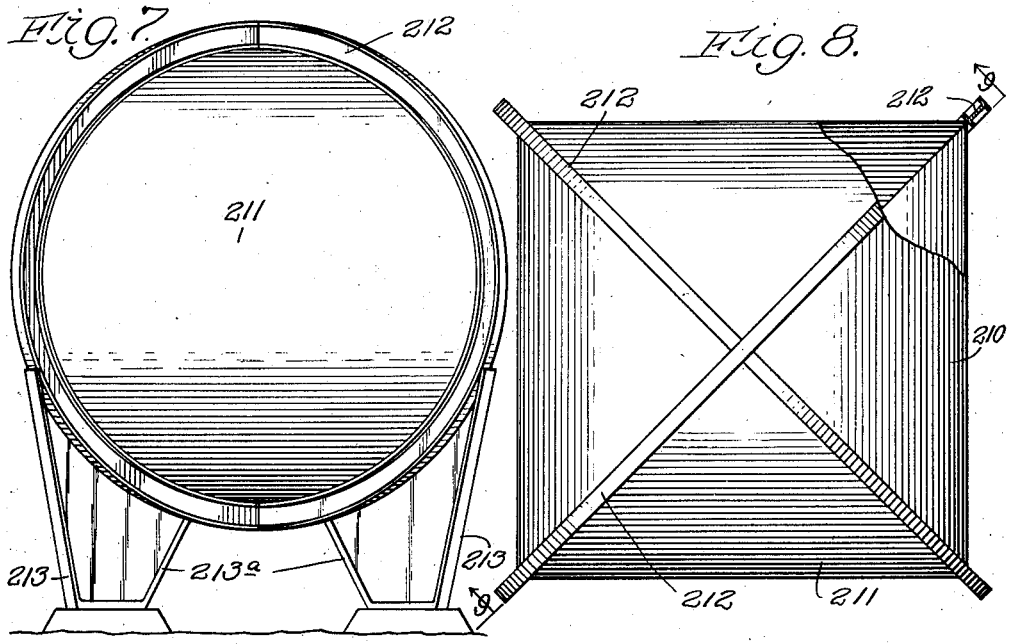
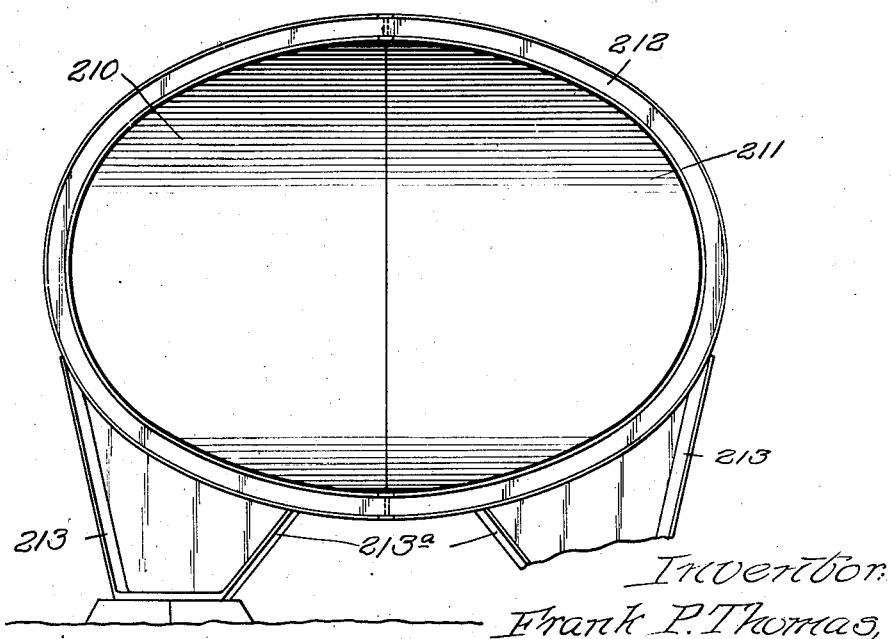

Feb. 17, 1942. F. P. THOMAS 2,273,601
CONTAINER
Filed Jan. 22, 1940 6 Sheets-Sheet 4
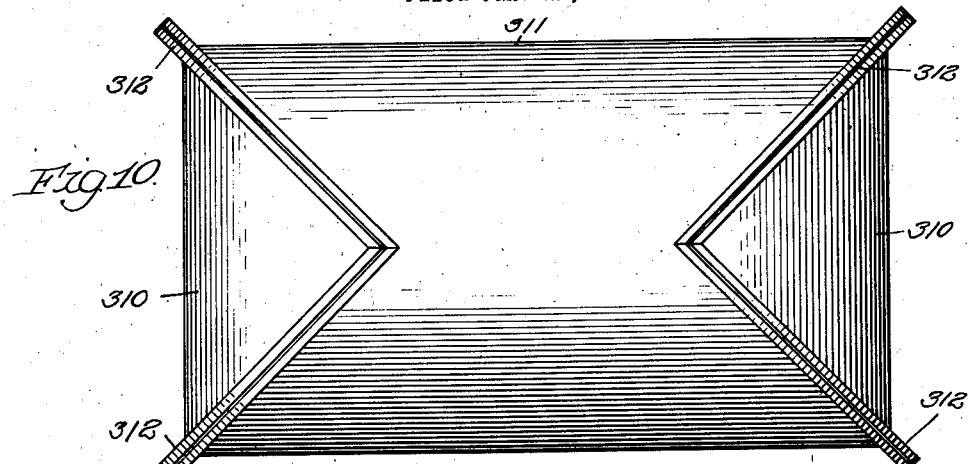
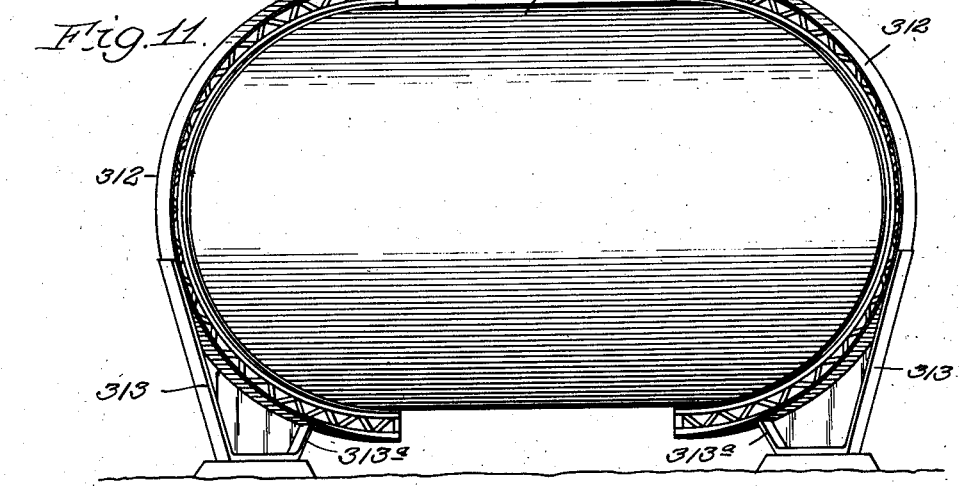
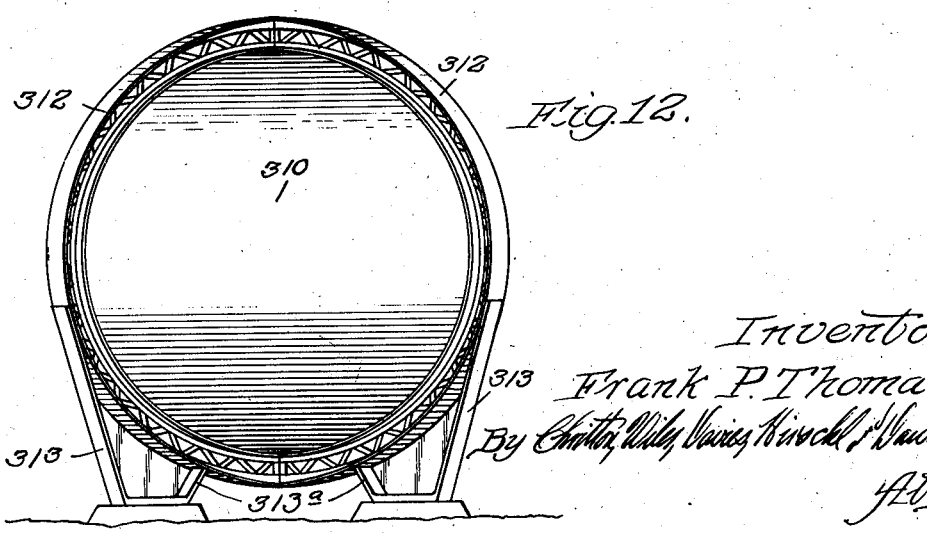
Inventor:
Frank P. Thomas, Feb. 17, 1942.  F. P. THOMAS  2,273,601
CONTAINER
Filed Jan. 22, 1940  6 Sheets-Sheet 5
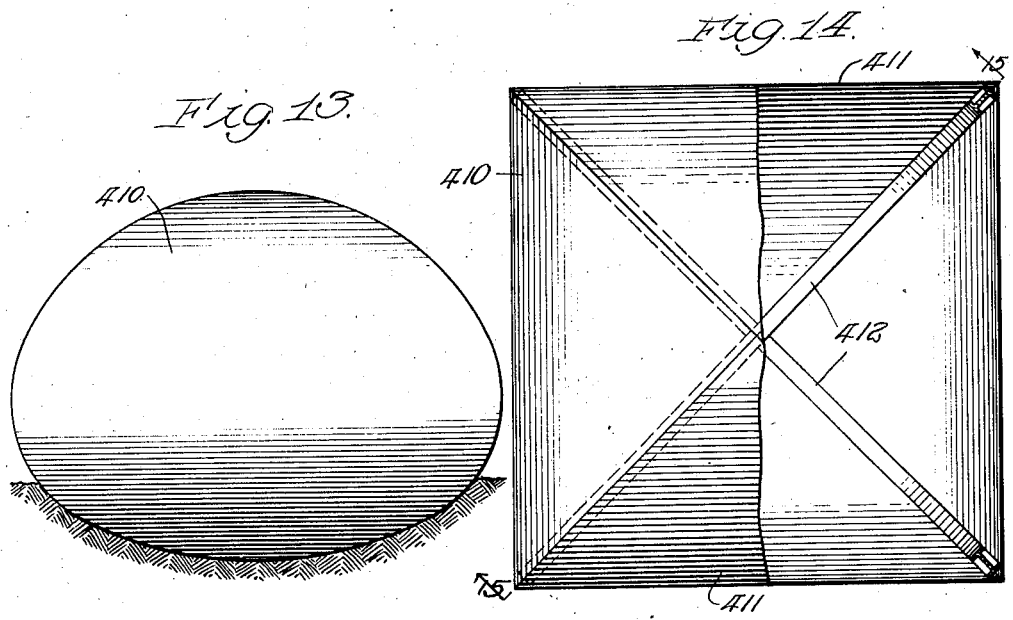
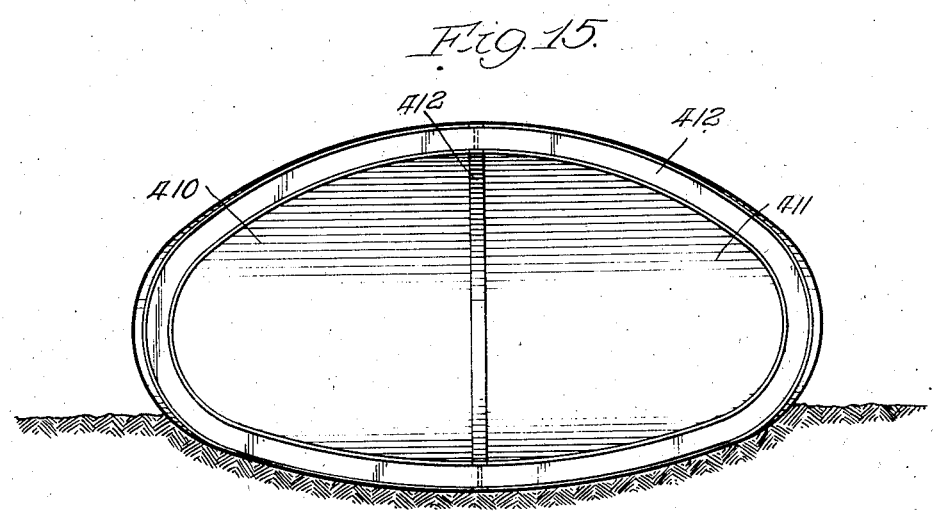
Inventor:
Frank P. Thomas,
By Clinton, Wiley, Davis, Hinckle, Dawson,
Attys.

Feb. 17, 1942. F. P. THOMAS 2,273,601
CONTAINER
Filed Jan. 22, 1940 6 Sheets-Sheet 6
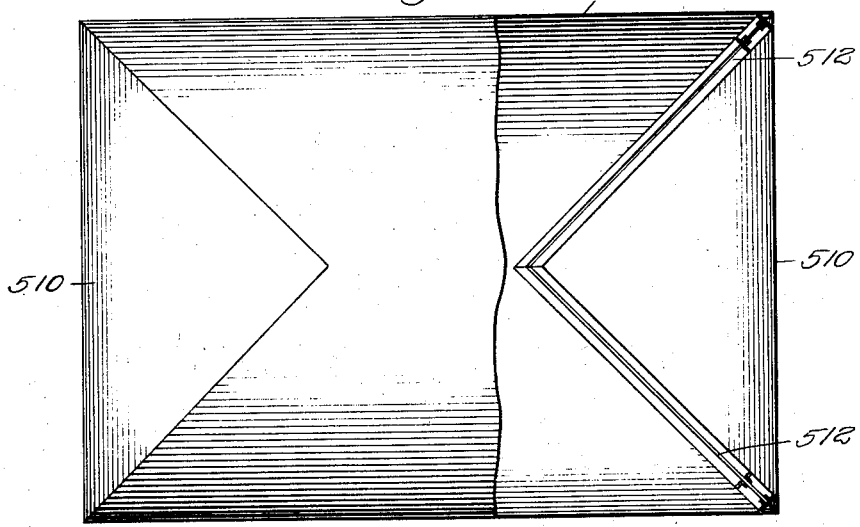
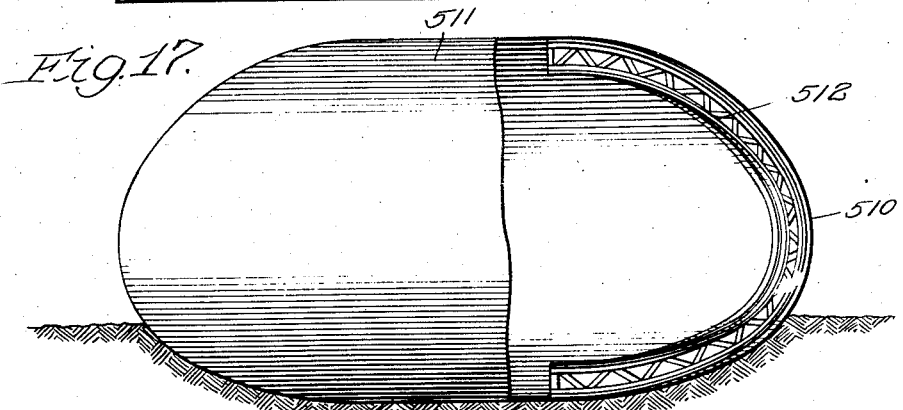
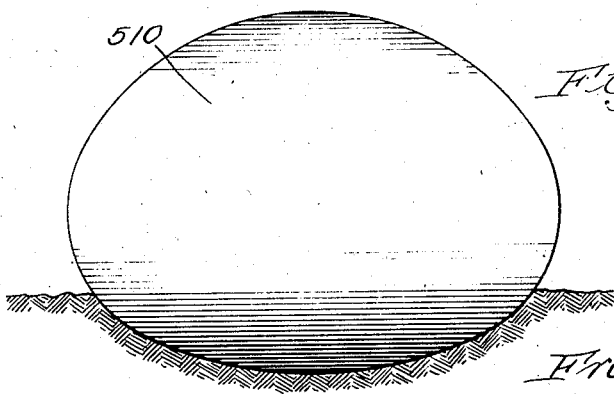
Inventor:
Frank P. Thomas,
By Clatton, Wills, Davies, Hirsch & Vawan,
Attys.

Patented Feb. 17, 1942

2,273,601

UNITED STATES PATENT OFFICE 2,273,601

CONTAINER

Frank P. Thomas, Chicago, Ill., assignor to Chicago Bridge & Iron Company, a corporation of Illinois Application January 22, 1940, Serial No. 315,084

2 Claims. (Cl. 220—1)

This invention relates to improvements in containers and more especially sheet metal pressure containers.

Among the features of my invention is the provision of a container adapted to withstand both positive and negative pressures to a considerable degree without failure or undue distortion.

Containers embodying the features of my invention may be very easily fabricated since they can be made of sheet metal curved in substantially only one plane.

My invention permits a wide variation in sizes, shapes and capacities of containers without requiring difficult computations.

Other features and advantages of my invention will appear more fully as I proceed with my specification.

Figure 1:
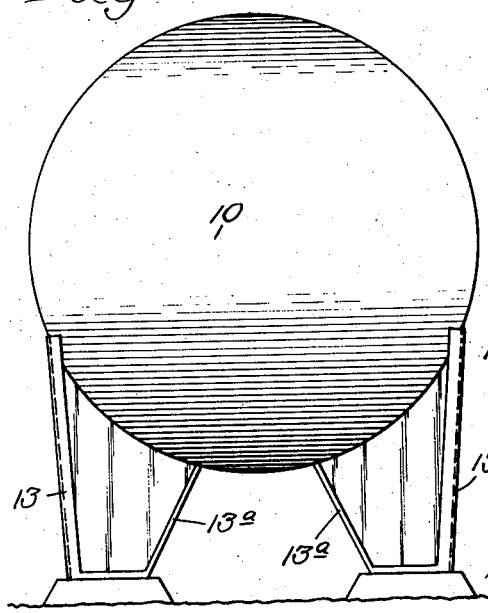
Figure 2:
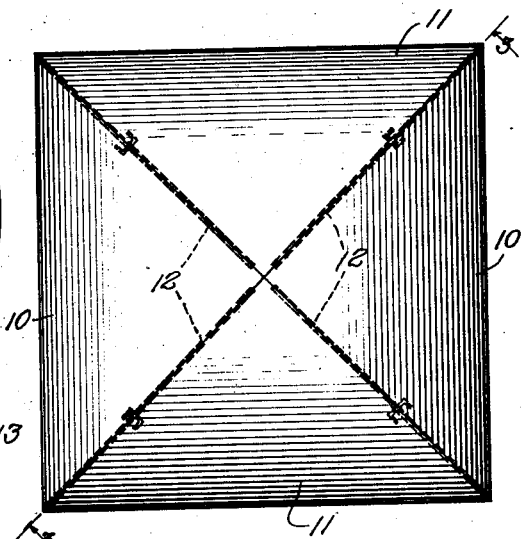
Figure 3:
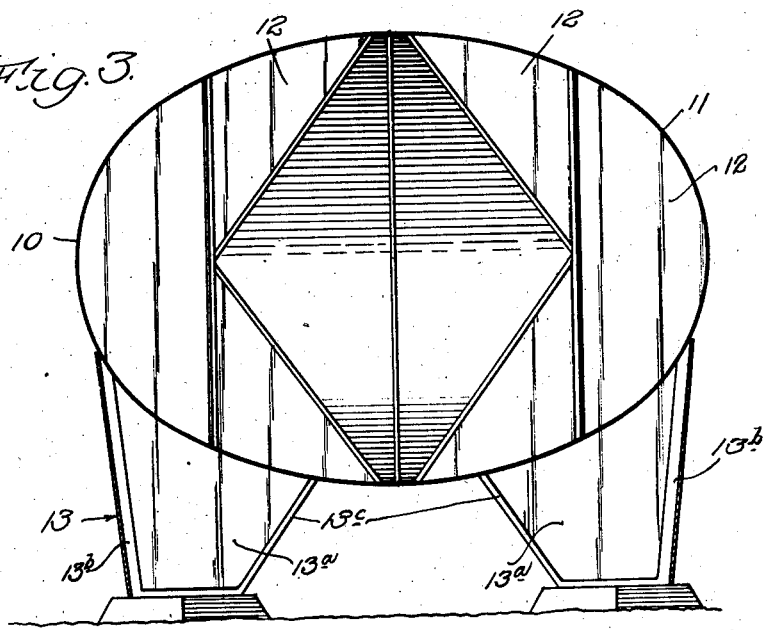

In those forms of device embodying the features of my invention shown in the accompanying drawings, Fig. 1 is a view in side elevation; Fig. 2 is a top plan view; Fig. 3 is a view taken as indicated by the line 3 of Fig. 2; Fig. 4 is a top plan view of a modified form with a portion broken away; Fig. 5 is a view of the same in side elevation with a portion broken away; Fig. 6 is a view of the same in end elevation; Fig. 7 is a view in side elevation of a modified form; Fig. 8 is a top plan view of the same with a portion broken away; Fig. 9 is a view taken as indicated by the line 9 of Fig. 8; Fig. 10 is a top plan view of another modified form; Fig. 11 is a view in side elevation of the same; Fig. 12 is a view of the same in end elevation; Fig. 13 is a side elevation of another modified form; Fig. 14 is a top plan view of the same, partly in section; Fig. 15 is a view taken as indicated by the line 15 of Fig. 14; Fig. 16 is a top plan view of another modified form with a part broken away; Fig. 17 is a view of the same in side elevation with a portion broken away; and Fig. 18 is an end view of the same.

As shown in Figs. 1, 2 and 3 the container is formed of two intersecting cylinders designated as 10 and 11 respectively. It is square in top plan as shown in Fig. 2 and circular when viewed from the front, back, or either side. It therefore has a vertical central substantially circular cross section and another vertical central substantially circular cross section at right angles to the first. The diagonal vertical central cross section as taken by the line 3 of Fig. 2 is oval. The container is braced internally by four cut-away diaphragms 12, 12 in the vertical and diagonal planes of the intersecting cylinders. It is here shown that the container is supported above the ground on the legs 13, 13 formed of plates 13ᵃ with outer stiffening members 13ᵇ and inner stiffening members 13ᶜ. As here shown the plates 13ᵃ are continuations of the internal diaphragms 12, 12.

The container shown in Figs. 4, 5 and 6 is formed by a cylinder 111 intersected by a cylinder 110 with a flat top and bottom. This container also is braced internally by cut-away diaphragms 112 lying in the vertical planes of the intersections of the members and is likewise supported on legs 113, 113 formed of plates 113ᵃ with outer and inner stiffeners 113ᵇ and 113ᶜ respectively. The plates 113ᵃ are continuations of the diaphragms 112.

The container of Figs. 4, 5 and 6 is oblong in top plan. It has one central vertical cross section in the shape of a rectangle with rounded ends, the central vertical cross section at right angles thereto being circular.

The container of Figs. 7, 8 and 9 has the same shape as that shown in Figs. 1, 2 and 3 but instead of being braced with internal diaphragms it is braced with two external ring girders 212 lying on the intersecting lines of the two cylinders.

The container of Figs. 10, 11 and 12 is similar in shape to the container of Figs. 4, 5 and 6 but is braced externally with the trusses 312 instead of the diaphragms 112.

The container of Figs. 13, 14 and 15 is similar in shape to the container of Figs. 1, 2 and 3 except that it is formed by the intersecting at right angles of two flattened cylinders. This container rests on the ground instead of being supported on legs and is braced by the internal ring girders 412 instead of by diaphragms.

The container of Figs. 16, 17 and 18 is similar in shape to that shown in Figs. 10, 11 and 12 except that the cylinder forming one of the intersecting members is flattened and the other member instead of having its ends semicircular has the same in the shape of a somewhat flattened semicircle.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. A rigid sheet metal pressure container rectangular in top plan, having all of its surfaces curved, said container formed by the intersection substantially at right angles of two similar flattened cylinders of the same cross-section and having their longitudinal axes intersecting, each wall of the container having its edges defined by the lines of intersection of the flattened cylinders.

2. A rigid sheet metal pressure container rectangular in top plan, having all of its surfaces curved, said container formed by the intersection substantially at right angles of two similar cylinders of the same cross-section and having their longitudinal axes intersecting, each wall of the container having its edges defined by the lines of intersection of the cylinders.

FRANK P. THOMAS.